(12) United States Patent
Salle et al.

(10) Patent No.: US 6,433,837 B1
(45) Date of Patent: Aug. 13, 2002

(54) DEMODULATOR, PARTICULARLY FOR A SECAM CHROMINANCE SIGNAL, WITH DOUBLE FREQUENCY ADJUSTMENT

(75) Inventors: Didier Salle, Grenoble; Gérard Bret, Echirolles, both of (FR)

(73) Assignee: STMicroelectronics, Gentilly (FR)

( * ) Notice: Subject to any disclaimer, the term of this patent is extended or adjusted under 35 U.S.C. 154(b) by 0 days.

(21) Appl. No.: 09/281,862

(22) Filed: Mar. 31, 1999

(30) Foreign Application Priority Data

Apr. 24, 1998 (FR) .............................................. 98 05186

(51) Int. Cl.$^7$ ................................................ H04N 9/66
(52) U.S. Cl. ...................... 348/638; 348/639; 348/727; 329/325; 331/20
(58) Field of Search ................................ 348/503, 504, 348/505, 506, 507, 508, 638, 639, 662, 663, 664, 665, 666, 667, 668, 669, 726–727; 329/315, 325; 331/17, 20, 36 C, 177 R; H04N 9/66

(56) References Cited

U.S. PATENT DOCUMENTS

| | | | | |
|---|---|---|---|---|
| 4,271,427 A | * | 6/1981 | Van Den Driessche | 348/638 |
| 4,410,856 A | * | 10/1983 | van Zanten | 329/319 |
| 4,963,831 A | * | 10/1990 | Stuivenwold et al. | 329/318 |
| 5,194,938 A | * | 3/1993 | Imbert et al. | 348/491 |
| 5,726,714 A | * | 3/1998 | Maldonado | 348/558 |
| 5,838,395 A | * | 11/1998 | Brilka | 348/726 |
| 6,091,308 A | * | 7/2000 | Salle | 331/111 |
| 6,151,080 A | * | 11/2000 | Salle et al. | 348/638 |

FOREIGN PATENT DOCUMENTS

| | | |
|---|---|---|
| DE | 3243014 A1 | 5/1984 |
| EP | 0 510 767 A2 | 4/1921 |
| JP | 07143511 | 2/1995 |
| JP | 09065356 | 7/1997 |

* cited by examiner

Primary Examiner—John W. Miller
Assistant Examiner—Brian P. Yenke
(74) Attorney, Agent, or Firm—Lisa K. Jorgenson; Allen, Dyer, Doppelt, Milbrath & Gilchrist, P. A.

(57) ABSTRACT

The demodulating device for a chrominance signal includes an oscillator with a controlled frequency, and an adjuster for adjusting the oscillator frequency as a function of a charge voltage of a memory capacitor. The adjuster preferably includes a fine adjustment channel to output a first adjustment value that depends on the charge voltage of the memory capacitor, and a coarse adjustment channel to output a second adjustment value. The second adjustment value is modified when the charge voltage of the memory capacitor is not within a given range. The device is used, for example, in integrated SECAM decoders.

26 Claims, 2 Drawing Sheets

DEMODULATOR, PARTICULARLY FOR A SECAM CHROMINANCE SIGNAL, WITH DOUBLE FREQUENCY ADJUSTMENT

FIELD OF THE INVENTION

The invention relates to a demodulator for a frequency modulated signal, and particularly for a SECAM chrominance signal. The invention is used, for example, in applications for the manufacture of televisions or video signal receivers.

BACKGROUND OF THE INVENTION

According to the SECAM standard, chrominance information in a video signal is transmitted by frequency modulation of chrominance sub-carriers. The video signal comprises a sequence of lines forming a picture. These lines include two successive lines that carry information corresponding to the red component and then corresponding to the blue component respectively, in a three-color image. The sub-carriers on which the information for the red and the blue is coded are centered on separate frequencies that are $F_{OR}$=4.406 MHZ for the red, and $F_{OB}$=4.250 MHZ for the blue.

Chrominance signal demodulators are used to extract information related to the red and blue components from the signal, and more precisely from frequency modulated sub-carriers. FIG. 1 shows the operating principle for a SECAM chrominance signal demodulator, in a diagrammatic and simplified manner.

The demodulator in FIG. 1 can be used to demodulate lines containing information related to the red or blue components. The demodulator consists mainly of an oscillator 10 with controlled frequency and a phase comparator 20. For the purposes of this invention, a phase comparator means a device that has two signal inputs and is capable of outputting a current or a voltage proportional to a phase difference between the two input signals.

The oscillator 10 is a voltage controlled oscillator (VCO) comprising two inputs 12, 14 called the loop input and the adjustment input respectively, and an output 16 that outputs a signal at a frequency that depends on the voltages applied at the loop and adjustment inputs. The input to the loop 12 of oscillator 10 is connected to an output 26 of the phase comparator 20, while the output 16 from oscillator 10 is connected to a first input 22 of the phase comparator. A second input 24 of the phase comparator is connected to a two-way switch 28 that selectively connects the second input either to a chrominance channel 30 that transmits the chrominance signal, or to a quartz external reference oscillator 32 that outputs a signal at a reference frequency.

The phase comparator associated with the oscillator forms a PLL (Phase Locked Loop) demodulator. When the two-way switch 28 connects the second input 24 of the phase comparator to the chrominance channel 30, the demodulator outputs a voltage V proportional to the frequency of the chrominance signal F. The voltage V is used as information representative of the color component (blue or red) corresponding to the signal present on channel 30.

The voltage V is such that V=kFU where k is a proportionality coefficient and U is a voltage applied to the adjustment input 14 of the oscillator.

The frequency of the output signal from oscillator 10 must be determined very precisely and must remain stable to control the precision of the demodulator output voltage V so that the equipment including the demodulator is disposed will be capable of high fidelity reproduction of the colors. Consequently, the oscillator 10 must be frequently matched to a reference frequency denoted $F_{ref}$, supplied by the external oscillator 32.

Oscillator 10 is matched by connecting the second input 24 of the phase comparator to the external reference oscillator 32. During the oscillator matching phase, an on-off switch 40 in an adjustment circuit 42 is closed. The matching phase may then be started, for example, by information that cancels out the video signal frame used to control the two-way switch 28 and the on-off switch 40. This circuit comprises a transconductor 44, one input of which is connected to the input of oscillator loop 12, and the other input is connected to a reference voltage source 46 outputting a voltage $V_{ref}$.

When the voltage at the input to the oscillator loop 10 is not equal to the reference voltage $V_{ref}$, the transconductor outputs a current (positive or negative) that charges or discharges a memory capacitor 48. Thus, the voltage U of the memory capacitor 48 applied to the oscillator adjustment input 14 is modified to adjust the oscillator output voltage to a value such that the oscillator loop input voltage becomes equal to $V_{ref}$.

During a demodulation phase, the on-off switch 40 is open and the adjusted voltage U is maintained at the terminals of capacitor 48.

Thus $V_{ref}=kF_{ref}U$ let $$U = \frac{V_{ref}}{kF_{ref}}$$

therefore:

$$V = kFU = kF\frac{V_{ref}}{kF_{ref}} = \frac{V_{ref}}{F_{ref}}F = HF$$

where H is the demodulation gain that is very precisely known as the ratio of the reference voltage to the reference frequency.

The voltage U must be kept as stable as possible between two oscillator matching phases, to prevent any deterioration in the color reproduction. Even a minor modification to the adjustment voltage U causes a large modification to the oscillation frequency of oscillator 10. This modification is particularly large if the gain on the adjustment loop is large. Thus, a leakage current from the memory capacitor 48 could disturb operation of the oscillator.

In order to reduce the influence of leakage currents and to make the oscillator stable between two matching phases, the capacitance of the memory capacitor 48 is chosen to be high. For example, the capacitance of the capacitor is chosen to be between 10 and 100 nF. These capacitance values form an obstacle, n or at least a handicap, for integrating the capacitor with the other demodulator components in the form of an integrated circuit. Thus capacitor 48 is usually not integrated on the chip comprising the video signal decoder, but it is in the form of a separate component.

SUMMARY OF THE INVENTION

The object of this invention is to provide a demodulator for frequency modulated signals, and particularly for SECAM chrominance signals, without the disadvantages mentioned above.

One object is to provide such a demodulator with a low capacitance memory capacitor, particularly suitable for production in the form of an integrated circuit.

Another object is to provide such a demodulator with an oscillator with a particularly stable frequency, and which is not very sensitive to leakage currents from the memory capacitor.

To achieve these objects, the demodulating device for a frequency modulated signal comprises an oscillator with controlled frequency, forming a demodulation loop with a phase comparator, and an adjuster for adjusting the oscillator frequency as a function of a charge voltage of a memory capacitor connected to an oscillator adjustment input.

The adjuster according to the invention comprises a fine adjustment channel to output a first adjustment value at the oscillator adjustment input, that depends on the voltage of the memory capacitor, and a coarse adjustment channel. The coarse adjustment channel outputs a second adjustment value added to the first adjustment value at the oscillator input. The second adjustment value is increased when the capacitor voltage exceeds a high limitation voltage or first threshold and is reduced when the capacitor voltage is below a low limitation voltage or second threshold.

The charging voltage of the capacitor may be fixed by appropriate means during an oscillator matching phase, for example as described previously with reference to FIG. 1.

The coarse adjustment channel may be designed to output an adjustment value that preferably corresponds to a majority fraction of the total adjustment value applied to the oscillator input. This adjustment value is not affected by any parasitic variation and is maintained independent of the variation of the state of charge of the capacitor between two oscillator matching phases.

The fine adjustment channel still contributes to variations in the charge of the memory capacitor. However, since this channel only supplies part (preferably a minority part) of the adjustment value, the total adjustment value supplied to the oscillator remains fairly insensitive to leakage currents that could affect the memory capacitor. Therefore, this capacitor may be made with a capacitance value less than what was usually used in prior art. Furthermore, the capacitor can then be made with other components of the device in the form of an integrated circuit.

The oscillator in the device according to the invention may be a voltage controlled oscillator (VCO), or a current controlled oscillator (CCO). In the first case, voltages are applied to the oscillator inputs, and in the second case, currents are applied to the oscillator inputs. Thus the term "adjustment value" may be understood as an adjustment voltage or as an adjustment current, depending on the oscillator type used.

In one particular embodiment of the fine adjustment channel, the fine adjustment may comprise an amplifier with an input connected to the memory capacitor and an output connected to the oscillator adjustment input, outputting the first adjustment value proportional to the capacitor charge voltage. For example, the amplifier may be a transconductor amplifier to convert the capacitor charge voltage into an adjustment current for a CCO type oscillator.

According to one variant, the capacitor may be connected directly through a voltage adder to the input of a VCO type oscillator. In this case the voltage adder can add adjustment voltages from the coarse and fine adjustment channels.

The coarse adjustment channel may comprise a digital-analog converter connected to the oscillator adjustment input to output an adjustment value corresponding to a coded digital value, and a modifier for modifying the digital value when the voltage of the memory capacitor is outside the voltage range between the high and low limitation voltages. Thus, low drops in the voltage of the memory capacitor due to leakage currents, which are insufficient to make the charge voltage drop below the low limitation voltage, do not cause any modifications to the coded digital value.

The digital value (for example, stored in a memory register) may be kept unchanged between two oscillator matching phases, in other words during demodulation phases. The modifier is usually only activated during an oscillator matching phase, when the capacitor charge voltage is no longer within the range of voltages between the high and low limitation voltages.

In one specific embodiment, the modifier may include a first comparator to compare the memory capacitor charge voltage with a low limitation voltage, and connected to the converter to reduce the coded digital value when the charge voltage is less than the low limitation value. A second comparator is provided to compare the capacitor charge voltage with a high limitation voltage and is connected to the converter to increase the coded digital value when the charge voltage exceeds the high limitation voltage.

Preferably, the increase and reduction in the memorized digital value occur in response to increasing and reducing pulses. The comparator output is a continuous output (high or low) rather than a pulse output, reflecting the value of the charge voltage compared with the corresponding limitation voltage. Thus, the first and second comparators may be coupled to a clock pulse generator to output pulses to the digital-analog converter to reduce or increase the digital value at each clock pulse until the charge voltage is between the high and low limitation voltages.

The digital value may be coded on a number N of bits and may be modified by a quantity corresponding to a lower order bit for each pulse. The digital-analog converter is then designed so that a modification of the digital value by a quantity corresponding to a lower order bit will result in a modification to the second adjustment value less than the maximum modification of the first adjustment value output by the fine adjustment channel. This is done in response to a variation in the capacitor charge voltage equal to the difference between the high limitation voltage and the low limitation voltage. Modifications to the second adjustment value output in response to a modification to the digital value exceeding a lower order bit are preferably larger than modifications to the first adjustment value of the fine adjustment channel.

According to one particular aspect, the device according to the invention may comprise a transconductor amplifier with input terminals connected to the terminals of a resistor through which an electric current passes that varies linearly with the current applied to the oscillator loop input, and with a current output terminal that can be connected to the memory capacitor during an oscillator matching phase. This type of manufacturing is particularly suitable for a CCO type oscillator. The oscillator loop input is connected to the phase comparator output to form a demodulation loop. The oscillator loop input also forms the demodulator output.

An on-off switch may be actuated to connect the transconductor amplifier output to the memory capacitor during oscillator matching phases. The phase comparator input is connected to a reference frequency generator during these matching phases.

According to one variant corresponding to a system including a VCO type oscillator, the device may also comprise a transconductor amplifier with a first input terminal connected to the oscillator loop input, and a second input terminal connected to a reference voltage source. A current output terminal is connected to the memory capacitor through an on-off switch.

The invention also relates to the use of the device described above as a SECAM chrominance signals demodulator.

BRIEF DESCRIPTION OF THE DRAWINGS

Other characteristics and advantages of this invention will become clearer from the following description with reference to the figures in the attached drawings. This description is given for illustrative purposes only and is in not intended to restrict the invention.

DETAILED DESCRIPTION OF THE PREFERRED EMBODIMENTS

Figure 1:
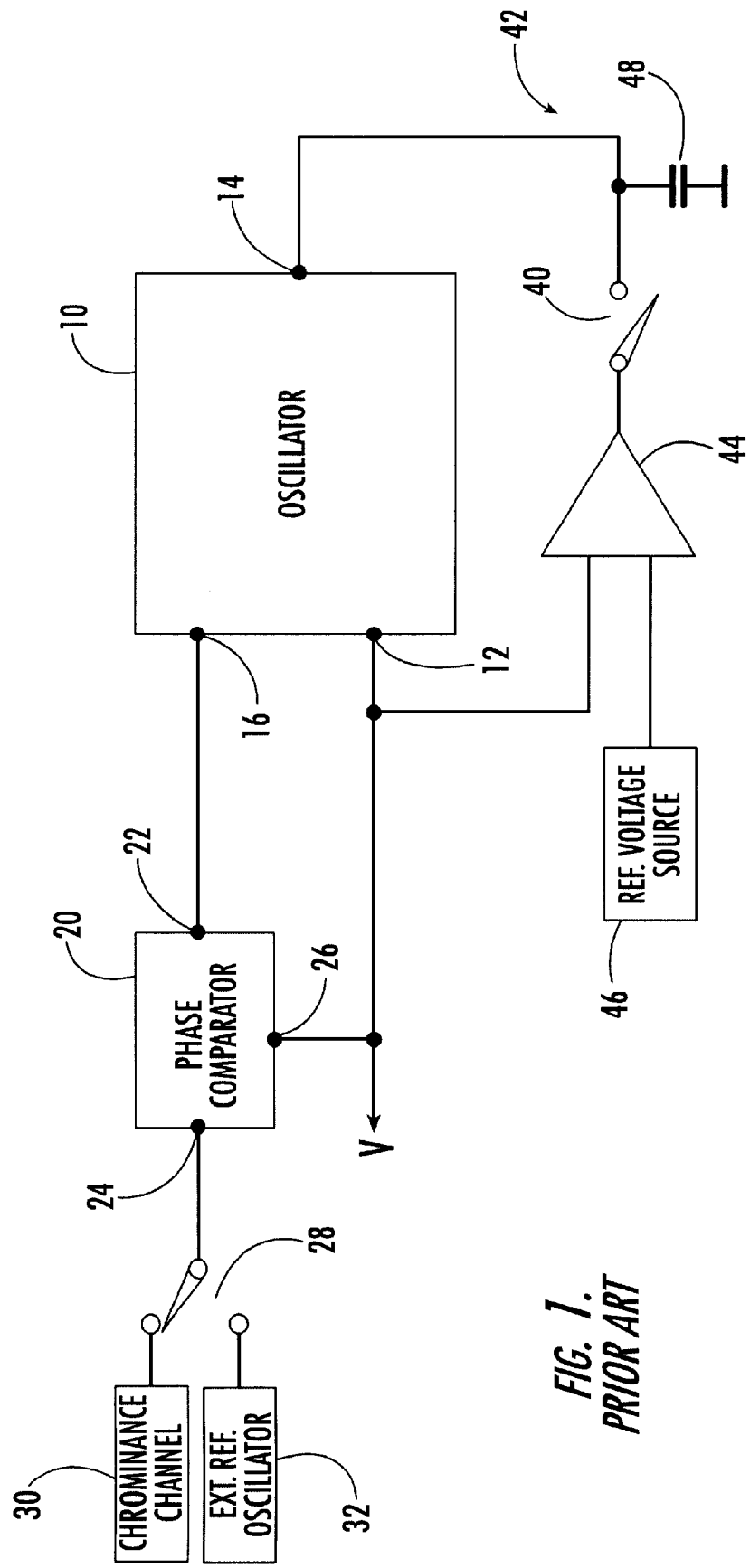
FIG. 1, already described, is a simplified block diagram of a prior art demodulator.
Figure 2:
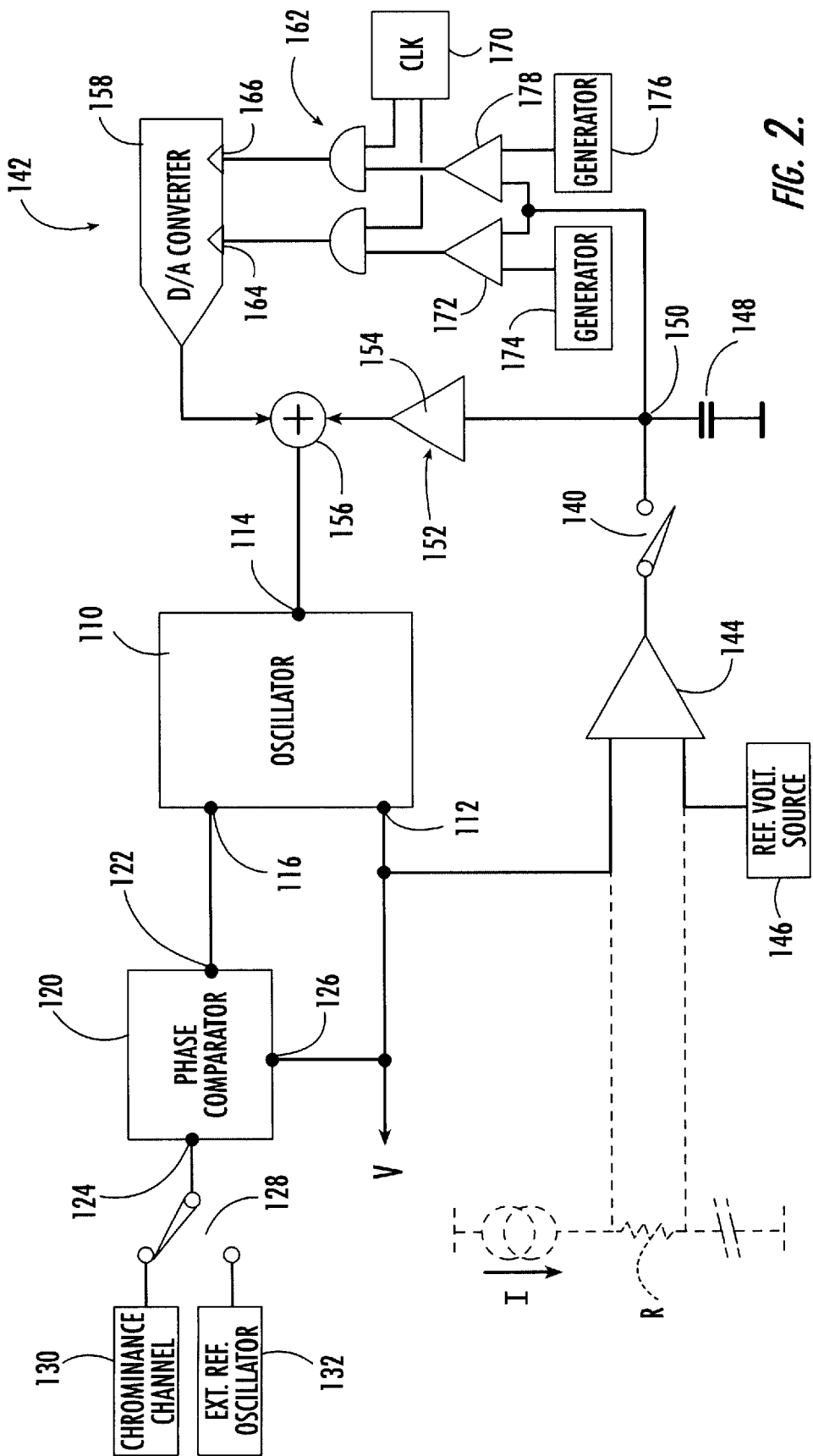
FIG. 2 is a simplified block diagram of a demodulator according to a specific embodiment according to the present invention.

Parts of the device in FIG. 2 that are identical, similar or equivalent to parts of FIG. 1 already described are identified with the same reference number plus 100. Thus, the reader can refer to the above description for these parts.

A first input 122 to the phase comparator 120 is connected to the output 116 from oscillator 110. The output 126 from the phase comparator is connected to the input of oscillator loop 112 that forms the demodulator output. In this example, the oscillator 110 is of the VCO type and the phase comparator output is a voltage output. The oscillator and the phase comparator thus form a phase locking loop.

A two-way switch 128 connects the second input 124 of the phase comparator either to a chrominance channel 130 that outputs a SECAM signal to be demodulated, or to a quartz external reference oscillator 132 outputting a signal at a reference frequency. The two-way switch 128, for example controlled by frame cancellation signals, connects the phase comparator input to the chrominance channel 130 during a demodulation phase and to the external oscillator 132 during an oscillator matching phase.

During the matching phase, an on-off switch 140 closes a frequency adjustment system 142 for the oscillator 110.

The system 142 comprises a transconductor amplifier 144 with a first input connected to the input 112 of the oscillator and a second input connected to a reference voltage generator 146. The output from the transconductor amplifier 144 outputs a positive or negative current proportional to the difference between the oscillator input voltage and the reference voltage. This current is zero when the voltage variation is zero.

According to one variant, in which the oscillator is of the CCO type and in which the phase comparator outputs a current at the oscillator input, the input terminals of the transconductor amplifier 146 may be connected to the terminals of a resistance R through which a current passes proportional to the oscillator input current. This current, for example, may be supplied by a current mirror. This variant is schematically shown as a dashed line.

The output from amplifier 144 is connected to a first terminal 150 of a memory capacitor 148. The other capacitor terminal is connected for example to the ground. The current output by the transconductor amplifier 144 charges or discharges the memory capacitor 148, by modifying the voltage at its terminals. This voltage, or a proportional voltage, could be a first adjustment value for the oscillator.

Thus, a first fine adjustment channel 152 of the adjustment system 142 comprises a voltage amplifier 154 connected to the first terminal 150 of the capacitor 148 to output a voltage proportional to the capacitor voltage, output at the oscillator adjustment input 114. The output from the voltage amplifier 154 is connected to the adjustment input 114 through a voltage adder 156.

The adder makes the sum between the adjustment voltage supplied by the fine adjustment channel 152 and a second adjustment voltage. The second adjustment voltage is output by a digital-analog converter 158 that forms part of a second coarse adjustment channel 162 of the adjustment system 142.

The digital-analog converter 158 memorizes a digital value coded on a number N of bits, for example 4, and outputs a voltage that can be equal to $2^N$ values respectively. A first pulse input 164 to the converter increases the coded digital value of a lower order bit for each received pulse, and a second pulse input 166 reduces the coded digital value of a lower order bit for each received pulse. The converter is designed such that changing the digital value of a lower order bit modifies the second adjustment voltage which is less than the maximum possible modification of the first adjustment voltage of the first channel.

The output from a first comparator 172, clocked by pulses from a clock 170, is applied to the first pulse input 164 on converter 158. The comparator 172 has an input connected to the first terminal 150 of the memory capacitor 148 onto which the capacitor charge voltage is applied, and an input connected to a voltage generator 174 outputting a high limitation voltage.

When the capacitor charge voltage exceeds the high limitation voltage, the comparator 172 has an active output state and a pulse is sent to the first pulse input at each pulse of clock 170. Conversely, when the voltage of memory capacitor 148 is less than a low limitation voltage output by a voltage generator 176, a second comparator 178, also connected to the first terminal 150 of the capacitor, has an active output state. Pulses clocked by clock 170 are then output to the second pulse input 166.

Clock 170, comparators 172 and 178, and generators 174 and 176 comprise a modifier for modifying the digital value when the voltage of the memory capacitor is outside a voltage range between the high and low limitation voltages. When the voltage from the memory capacitor 148 remains between the low and high limitation values, no pulses are output to the digital-analog converter and the memorized digital value remains unchanged.

Due to the coarse adjustment channel described above, the maximum adjustment value to be output by the fine adjustment channel may be reduced to become $2^N-1$ time less than the value for a circuit according to prior art. The maximum adjustment value output by the fine adjustment channel is equal to the gain of the voltage amplifier 154 that multiplies the difference between the low and high limitation voltages. Thus, the influence of capacitor parasite discharge currents is very small. Furthermore, low capacitance values on the order of 100 to 200 pF are sufficient to make the memory capacitor for the device according to the invention.

That which is claimed is:

1. A demodulating device for a frequency modulated signal, the demodulating device comprising:
    a phase comparator;
    an oscillator with a controlled frequency, the oscillator having an adjustment input and the oscillator forming a demodulation loop with the phase comparator;

a memory capacitor connected to the oscillator adjustment input; and an adjuster for adjusting the oscillator frequency as a function of a voltage of the memory capacitor, the adjuster comprising
  a fine adjustment channel to output a first adjustment value at the oscillator adjustment input, that depends on the voltage of the memory capacitor, and
  a coarse adjustment channel to output a second adjustment value added to the first adjustment value at the oscillator input, the second adjustment value being increased when the voltage of the memory capacitor exceeds a first threshold and being reduced when the voltage of the memory capacitor is below a second voltage threshold.

2. A demodulating device according to claim 1, wherein the fine adjustment channel comprises an amplifier with an input connected to the memory capacitor, and an output connected to the oscillator adjustment input, the output producing the first adjustment value proportional to the voltage of the memory capacitor.

3. A demodulating device according to claim 1, wherein the coarse adjustment channel comprises:
  a digital-analog converter connected to the adjustment input of the oscillator to output an adjustment value corresponding to a coded digital value; and
  a modifier for modifying the digital value when the voltage of the memory capacitor is outside a voltage range between the first and second thresholds.

4. A demodulating device according to claim 3, wherein the modifier comprises:
  a first comparator connected to the digital-analog converter to reduce the coded digital value when the voltage of the memory capacitor is less than the second threshold; and
  a second comparator connected to the digital-analog converter to increase the coded digital value when the voltage of the memory capacitor exceeds the first threshold.

5. A demodulating device according to claim 4, further comprising a clock pulse generator and wherein the first and second comparators are coupled to the clock pulse generator to output pulses to the digital-analog converter to increase or decrease the digital value at each clock pulse, until the voltage is between the first and second thresholds.

6. A demodulating device according to claim 5, wherein the digital value is coded on a number N of bits and is modified by a quantity corresponding to a lower order bit in each pulse; and wherein the digital-analog converter is such that a modification to the digital value of a quantity corresponding to a lower order bit will modify the adjustment value less than a modification of a maximum adjustment value output by the fine adjustment channel in response to a variation in the voltage of the memory capacitor equal to the difference between the first and second thresholds.

7. A demodulating device according to claim 1, wherein the oscillator is a current controlled oscillator and wherein the first and second adjustment values are adjustment currents.

8. A demodulating device according to claim 1, wherein the oscillator is a voltage controlled oscillator and wherein the first and second adjustment values are adjustment voltages.

9. A demodulating device according to claim 7 further comprising:
  a resistor; and
  a transconductor amplifier with inputs connected to the resistor through which an electric current passes varying linearly with a current applied to an input of the demodulator loop, and having a current output to be connected to the memory capacitor during an oscillator matching phase.

10. A demodulating device according to claim 9, further comprising a transconductor amplifier having a first input connected to an input of the demodulation loop, a second input connected to a reference voltage source, and a current output to be connected to the memory capacitor during an oscillator matching phase.

11. A demodulating device according to claim 1, wherein the demodulating device is an integrated circuit.

12. A chrominance signal demodulator comprising:
  a chrominance channel for transmitting a chrominance signal;
  an external reference oscillator for outputting a signal at a reference frequency; and
  a demodulating device including
    a phase comparator,
    a switch that selectively connects the chrominance channel or the external reference oscillator to an input of the phase comparator,
    an oscillator with a controlled frequency, the oscillator having an adjustment input and the oscillator forming a demodulation loop with the phase comparator,
    a memory capacitor connected to the oscillator adjustment input, and
    an adjuster for adjusting the oscillator frequency as a function of a voltage of the memory capacitor, the adjuster comprising
      a fine adjustment channel to output a first adjustment value at the oscillator adjustment input, that depends on the voltage of the memory capacitor, and
      a coarse adjustment channel to output a second adjustment value added to the first adjustment value at the oscillator input, the second adjustment value being increased when the voltage of the memory capacitor exceeds a first threshold and being reduced when the voltage of the memory capacitor is below a second voltage threshold.

13. A chrominance signal demodulator according to claim 12, wherein the fine adjustment channel comprises an amplifier with an input connected to the memory capacitor, and an output connected to the oscillator adjustment input, the output producing the first adjustment value proportional to the voltage of the memory capacitor.

14. A chrominance signal demodulator according to claim 12, wherein the coarse adjustment channel comprises:
  a digital-analog converter connected to the adjustment input of the oscillator to output an adjustment value corresponding to a coded digital value; and
  a modifier for modifying the digital value when the voltage of the memory capacitor is outside a voltage range between the first and second thresholds.

15. A chrominance signal demodulator according to claim 14, wherein the modifier comprises:
  a first comparator connected to the digital-analog converter to reduce the coded digital value when the voltage of the memory capacitor is less than the second threshold; and
  a second comparator connected to the digital-analog converter to increase the coded digital value when the voltage of the memory capacitor exceeds the first threshold.

16. A chrominance signal demodulator according to claim 15, further comprising a clock pulse generator and wherein the first and second comparators are coupled to the clock pulse generator to output pulses to the digital-analog converter to reduce or increase the digital value at each clock pulse, until the voltage is between the first and second thresholds.

17. A chrominance signal demodulator according to claim 16, wherein the digital value is coded on a number N of bits and is modified by a quantity corresponding to a lower order bit in each pulse; and wherein the digital-analog converter is such that a modification to the digital value of a quantity corresponding to a lower order bit will modify the adjustment value less than a modification of a maximum adjustment value output by the fine adjustment channel in response to a variation in the voltage of the memory capacitor equal to the difference between the first and second thresholds.

18. A chrominance signal demodulator according to claim 12, wherein the oscillator is a current controlled oscillator and wherein the first and second adjustment values are adjustment currents.

19. A chrominance signal demodulator according to claim 12, wherein the oscillator is a voltage controlled oscillator and wherein the first and second adjustment values are adjustment voltages.

20. A chrominance signal demodulator according to claim 18, wherein the demodulating device further comprises:
    a resistor; and
    a transconductor amplifier having inputs connected to the terminals of the resistor through which an electric current passes varying linearly with a current applied to an input of the demodulator loop, and having a current output to be connected to the memory capacitor during an oscillator matching phase.

21. A chrominance signal demodulator according to claim 19, wherein the demodulating device further comprises a transconductor amplifier having a first input connected to an input of the demodulation loop, a second input connected to a reference voltage source, and a current output to be connected to the memory capacitor during an oscillator matching phase.

22. A demodulating process using a demodulating device including a phase comparator, an oscillator with a controlled frequency, the oscillator having an adjustment input and the oscillator forming a demodulation loop with the phase comparator, a memory capacitor connected to the oscillator adjustment input, and an adjuster for adjusting the oscillator frequency as a function of a voltage of the memory capacitor, the adjuster comprising a fine adjustment channel and a coarse adjustment channel, the demodulating process comprising the steps of:
    outputting a first adjustment value from the fine adjustment channel to the oscillator adjustment input, the first adjustment value depending on the voltage of the memory capacitor;
    outputting a second adjustment value from the coarse adjustment channel and adding the second adjustment value to the first adjustment value at the oscillator input;
    increasing the second adjustment value when the voltage of the memory capacitor exceeds a first threshold; and
    reducing the second adjustment value when the voltage of the memory capacitor is below a second voltage threshold.

23. A demodulating process according to claim 22, wherein the fine adjustment channel includes an amplifier with an input connected to the memory capacitor, and an output connected to the oscillator adjustment input; and further comprising the step of producing the first adjustment value proportional to the voltage of the memory capacitor from the output of the amplifier.

24. A demodulating process according to claim 22, wherein the coarse adjustment channel includes a digital-analog converter connected to the adjustment input of the oscillator, and a modifier; and further comprising the steps of:
    outputting an adjustment value, from the digital-analog converter, corresponding to a coded digital value, and
    modifying the digital value when the voltage of the memory capacitor is outside a voltage range between the first and second thresholds.

25. A demodulating process according to claim 24, wherein the modifier comprises a first comparator and a second comparator; and further comprising the steps of:
    reducing the coded digital value when the voltage is less than the second threshold, and
    increasing the coded digital value when the voltage exceeds the first threshold.

26. A demodulating process according to claim 25, wherein the first and second comparators are coupled to a clock pulse generator; and further comprising the step of outputting pulses to the digital-analog converter to increase or decrease the digital value at each clock pulse, until the voltage is between the first and second thresholds.

* * * * *

UNITED STATES PATENT AND TRADEMARK OFFICE
CERTIFICATE OF CORRECTION

PATENT NO. : 6,433,837 B1
DATED : August 13, 2002
INVENTOR(S) : Didier Salle and Gérard Bret It is certified that error appears in the above-identified patent and that said Letters Patent is hereby corrected as shown below:

<u>Title page,</u>
Item [73], delete "STMicroelectronics" insert -- STMicroelectronics S.A. --

<u>Column 8,</u>
Line 7, delete "claim 9" insert -- claim 8 --

Signed and Sealed this

Twenty-first Day of January, 2003

JAMES E. ROGAN
*Director of the United States Patent and Trademark Office*